United States Patent
Ayaki et al.

(10) Patent No.: US 7,580,058 B2
(45) Date of Patent: Aug. 25, 2009

(54) IMAGE CAPTURING APPARATUS AND IMAGE CAPTURING METHOD

(75) Inventors: Kenichiro Ayaki, Saitama (JP); Koji Kobayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 637 days.

(21) Appl. No.: 11/334,359

(22) Filed: Jan. 19, 2006

(65) Prior Publication Data
US 2006/0158532 A1   Jul. 20, 2006

(30) Foreign Application Priority Data
Jan. 19, 2005 (JP) ............................. 2005-012135

(51) Int. Cl.
H04N 5/228 (2006.01)
H04N 5/235 (2006.01)
(52) U.S. Cl. .............................. 348/208.12; 348/229.1; 348/362
(58) Field of Classification Search ............ 348/208.12, 348/229.1, 362
See application file for complete search history.

(56) References Cited

U.S. PATENT DOCUMENTS

| | | | | |
|---|---|---|---|---|
| 7,039,307 | B2 * | 5/2006 | Uchida | 396/67 |
| 7,095,001 | B2 * | 8/2006 | Kawahara | 250/201.2 |
| 7,221,394 | B2 * | 5/2007 | Enomoto | 348/229.1 |
| 2004/0095472 | A1 * | 5/2004 | Yoshida et al. | 348/208.12 |
| 2004/0189825 | A1 * | 9/2004 | Kawashima | 348/231.3 |
| 2005/0061952 | A1 * | 3/2005 | Kawahara | 250/208.1 |
| 2005/0212955 | A1 * | 9/2005 | Craig et al. | 348/362 |
| 2006/0029382 | A1 * | 2/2006 | Uchida | 396/166 |

* cited by examiner

*Primary Examiner*—James M Hannett
(74) *Attorney, Agent, or Firm*—Birch, Stewart, Kolasch & Birch, LLP

(57) ABSTRACT

An image signal obtained by a CCD image sensor is amplified by an amplifier. A gain of the amplifier is changed according to an ISO sensitivity. An AE circuit measures light intensity of a subject. According to the measured light intensity, a correct exposure time of the CCD image sensor is calculated. The exposure time of the CCD image sensor is changed by a CCD driver. In the exposure adjustment, a system controller increases the gain by making the ISO sensitivity higher such that the calculated exposure time becomes shorter than a predetermined anti-camera shake exposure time.

8 Claims, 4 Drawing Sheets

IMAGE CAPTURING APPARATUS AND IMAGE CAPTURING METHOD

BACKGROUND OF THE INVENTION

1. Field of the Invention

The present invention relates to an image capturing apparatus such as a digital camera having an image sensor for photoelectrically converting a subject light to generate an image signal and such an image capturing method.

2. Background Arts

Digital cameras have become widespread. The digital camera captures a subject image focused through a taking lens by using an image sensor of CCD type, MOS type or the like, and then produces image data from the image signal output from the image sensor and records it in a memory.

When a flash is used for capturing the image of a subject such as a person and an animal, the flash light may cause discomfort to the subject and, in this case, the image cannot be captured in a natural condition. However, when the flash is not used and an exposure time (a charge storing time) is increased, the captured image becomes blurred due to a camera shake and the like. To solve such problems, a digital camera is known which increases an ISO sensitivity instead of the exposure time when capturing the image (for instance, see U.S. Patent Application Publication No. 2004/0189825).

However, when using the digital camera disclosed in the above reference, a user need to select and set the ISO sensitivity suitable to the image capturing conditions. The user further needs to set the exposure time in accordance with the set ISO sensitivity. Such setting operation is regarded as troublesome by the general users and not commonly used.

SUMMARY OF THE INVENTION

An object of the present invention is to provide an image capturing apparatus and an image capturing method for capturing an image at a correct exposure without a flash emission.

In order to achieve the above and other objects, the image capturing apparatus according to the present invention includes a measurement device for measuring light intensity of a subject (a brightness), an exposure time calculator and an ISO sensitivity changing section for changing an ISO sensitivity. The exposure time calculator calculates an exposure time of the image sensor (a shutter speed) according to the light intensity of the subject with a certain ISO sensitivity. The ISO sensitivity changing section changes the ISO sensitivity such that the exposure time becomes shorter than a predetermined anti-camera shake exposure time. According to the changed ISO sensitivity, a gain of an amplifier for amplifying the electric signal from the image sensor is adjusted. The light intensity of the subject is evaluated from an output signal of the amplifier. The anti-camera shake exposure time is equal to or a little longer than a threshold limit of the anti-camera shake exposure time and is previously determined.

In an embodiment of the present invention, the image capturing apparatus includes an aperture mechanism for changing an aperture. The aperture mechanism increases the aperture before changing the ISO sensitivity to make the exposure time shorter than the predetermined anti-camera shake exposure time. The ISO sensitivity is changed discretely or continuously from a predetermined default value. Then, the exposure time is calculated by measuring the light intensity of the subject with a changed ISO sensitivity. The exposure time is calculated while a release button is half-pressed, and the image is captured for recording when the release button is fully pressed.

In another embodiment of the present invention, the image capturing apparatus includes a sound generator for generating a sound according to the ISO sensitivity. The sound generator generates a sound when a release button is fully pressed for recording the image.

In a preferred embodiment of the image capturing method of the present invention, an aperture is increased when the exposure time calculated at a first ISO sensitivity is longer than the predetermined anti-camera shake exposure time. The changing of the aperture and the measurement of the light intensity are continued until the exposure time becomes shorter than the predetermined anti-camera shake exposure time. When the exposure time is still longer than the predetermined anti-camera shake exposure time even if the aperture becomes the maximum value, the ISO sensitivity is changed and the light intensity of the subject is measured.

In the present invention, when the exposure time is longer than the anti-camera shake exposure time, the ISO sensitivity is made shorter than the anti-camera shake exposure time. As a result, an image in a dark place is obtained at the correct exposure without the flash emission.

BRIEF DESCRIPTION OF THE DRAWINGS

The above objects and advantages of the present invention will become apparent from the following detailed descriptions of the preferred embodiments when read in association with the accompanying drawings, which are given by way of illustration only and thus do not limit the present invention. In the drawings, the same reference numerals designate like or corresponding parts throughout the several views, and wherein.

DETAILED DESCRIPTION OF THE EMBODIMENTS

Figure 1:
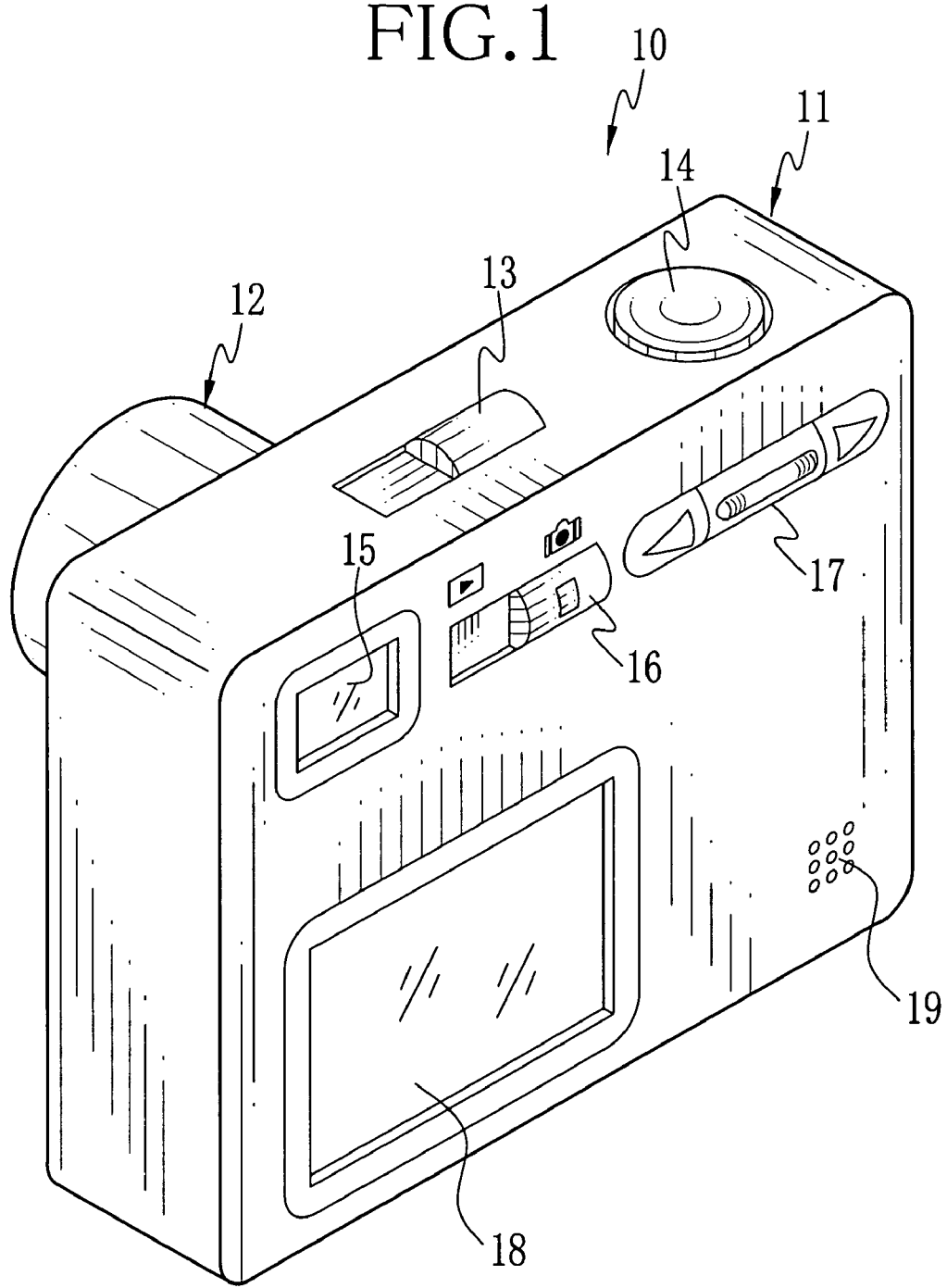
FIG. 1 is a perspective view of a digital camera according to the present invention.

In FIG. 1, on a front face of a camera body 11 of a digital camera 10, a lens barrel 12 slidably holding a taking lens is provided. On an upper surface of the main body 11, a power switch 13 and a shutter button 14 are disposed. The shutter button 14 is a two-step button. When the shutter button 14 is half-pressed, a first-step switch is turned on to perform a capturing preparation process including a focus adjustment and an exposure adjustment of the taking lens. Then, when the shutter button 14 is fully pressed, a second-step switch is turned on. At this time, an image is captured by a CCD image sensor. The data obtained in this image capture is recorded in a memory card.

On a back face of the main body 11, a viewfinder window 15, a mode changeover switch 16, a multipurpose key 17, an LCD (liquid crystal display) panel 18, a speaker 19 and the like are disposed. The mode changeover switch 16 switches between an image capture mode for performing the image capture process and a reproduction mode for reproducing and displaying the images recorded in the memory card on the LCD panel 18. In addition to displaying the reproduced images in the reproduction mode, the LCD panel 18 also functions as an electronic viewfinder displaying a through image for monitoring a subject in the image capture mode. Further, the LCD panel 18 displays a setting screen for configuration of various settings.

Figure 2:
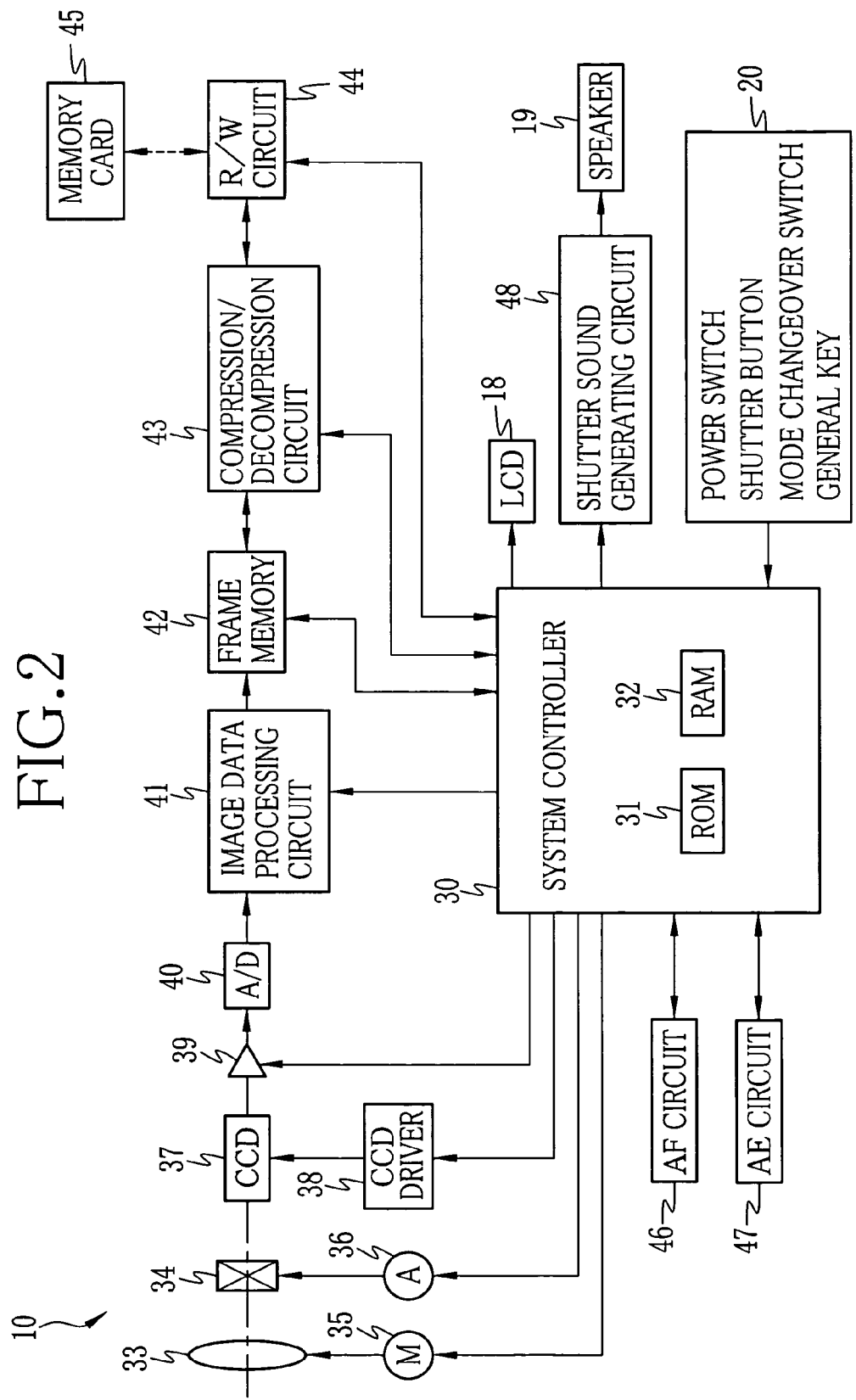
FIG. 2 is a block diagram showing an electrical configuration of the digital camera.

In FIG. 2, each section of the digital camera 10 is controlled by a system controller 30. In a ROM (Read Only Memory) 31, a control program and various setting data are stored. Based on the operation signals input from an operation unit 20 (the power switch 13, the shutter button 14, the mode changeover switch 16 and the multipurpose key 17), the system controller 30 follows the steps described in the control program to control each section. A RAM (Random Access Memory) 32 is a work memory for the system controller 30 to execute the control program.

In the lens barrel 12, a taking lens 33 for forming the subject image and an aperture mechanism 34 for limiting the subject light are incorporated. The taking lens 33 is moved along an optical axis by a lens motor 35 to adjust focus. The aperture mechanism 34 is driven by an actuator 36 to change an aperture diameter (an aperture value). The aperture value is changed between F/4.0 and F/2.8 (a full aperture).

Behind the aperture mechanism 34, a CCD image sensor 37 is disposed. As is well known, the CCD image sensor 37 has a photoelectric conversion surface (a light-receiving surface) in which a plurality of photoreceptors (photodiodes) are arranged in a matrix. The CCD image sensor 37 photoelectrically converts the subject light which is focused on the photoelectric conversion surface through the taking lens 33 and the aperture mechanism 34.

The CCD image sensor 37 is driven by a CCD driver 38. An exposure time of the CCD image sensor 37 (a shutter speed) is adjusted by the CCD driver 38 according to the commands from the system controller 30. The CCD image sensor 37 outputs accumulated charges in the pixels, line-by-line, as serial image signals (CCD-RAW data) while synchronizing with a vertical transfer clock and a horizontal transfer clock supplied by the CCD driver 38. The CCD driver 38 will be regarded as an exposure time changing section.

Noise of the image signal output from the CCD image sensor 37 is removed through a correlated double sampling processing. Then, the image signal is input to an A/D converter 40 through a variable gain amplifier 39. The system controller 30 sets the amplification factor of the amplifier 39, to which the image signal is amplified. The amplification factor corresponds to an ISO sensitivity (a sensitivity to light). In this embodiment, the ISO sensitivity is changed between four levels, ISO 200, ISO 400, ISO 800 and ISO 1600. The controller 30 will be regarded as a sensitivity changing section.

The A/D converter 40 converts the amplified image data into a digital form and inputs the digital data to an image data processing circuit 41. The image data processing circuit 41 performs image processing to the input image data such as a matrix operation processing, a white balance adjustment, a gamma correction, a pixel skipping and the like. Thereafter, the image data is temporarily stored in a frame memory 42. On the LCD panel 18, the image data stored in the frame memory 42 is displayed as the through image.

When the shutter button 14 is fully pressed, the subject is captured by the CCD image sensor 37 and the image data is generated. The generated image data is subject to the image processing. Thereafter, the image data is stored in the frame memory 42. The image data stored in the frame memory 42 is compressed in a compression/decompression circuit 43 and input to a read/write circuit 44. The read/write circuit 44 writes the compressed image data to a memory card 45. Note that in the reproduction mode, the read/write circuit 44 reads the image data from the memory card 45 and inputs the image data to the compression/decompression circuit 43. The image data decompressed in the compression/decompression circuit 43 is reproduced and displayed on the LCD panel 18 through a Video RAM (not shown).

An AF (Auto Focus) circuit 46 adds high frequency portions of a spatial frequency of the image data of the through image stored in the frame memory 42. During the capturing preparation process, the system controller 30 detects the position of the taking lens 33 at which the integrated value of the high frequency portions obtained by the AF circuit 46 becomes maximum while controlling the taking lens 33 through the lens motor 35.

An AE (Auto Exposure) circuit 47 measures subject light intensity (a brightness) according to the image data of the through image stored in the frame memory 42 and calculates the exposure time and the aperture value of the CCD image sensor 37 according to the measured value. When the shutter button 14 is fully pressed, the system controller 30 controls the actuator 36, the CCD driver 38 and the amplifier 39 to adjust the exposure such that the aperture value, the exposure time and the ISO sensitivity respectively have optimum values. The AE circuit 47, together with the CCD image sensor 37, will be regarded as a measurement section. The AE circuit 47 will also be regarded as an exposure time calculating circuit.

When the shutter button 14 is half-pressed, the system controller 30 adjusts focus and measures the brightness. When the shutter button 14 is fully pressed, the system controller 30 executes the image capture processing by the previously determined exposure time. Further, when the shutter button 14 is fully pressed, a shutter sound generating circuit 48 outputs a sound (a pseudo shutter sound) to the speaker 19 according to the set aperture value and ISO sensitivity. The shutter sound generating circuit 48 and the speaker 19 will be regarded as a sound output section.

Figure 3:
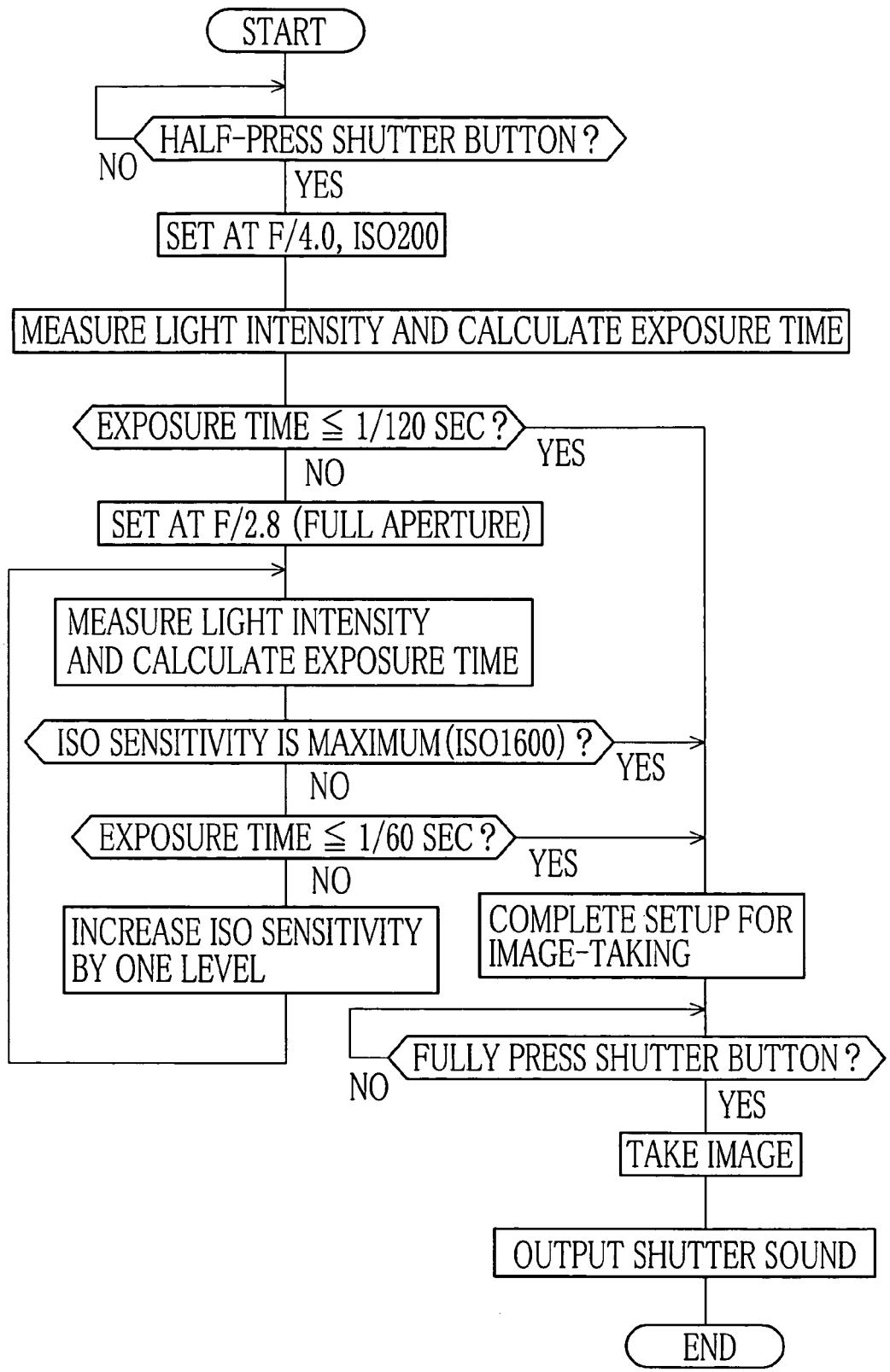
FIG. 3 is a flowchart showing an image capture process.

The steps in the image capture process of the digital camera 10 configured as above are described according to a flowchart in FIG. 3. Note that a description of the focus adjustment during the capturing preparation process is omitted. When the digital camera 10 is set in the image capture mode, the through image is displayed on the LCD panel 18. While observing the through image, when the user half-presses the shutter button 14, the capturing preparation process is started. The aperture value of the aperture mechanism is set at F/4.0 and the ISO sensitivity is set at ISO 200.

In this state, the AE circuit 47 measures the subject light intensity (the brightness), and calculates the exposure time to obtain the optimum brightness of the image. When the calculated exposure time is $1/120$ second or less, the capturing preparation process is completed. When the calculated exposure time is more than $1/120$ second, the aperture diameter of the aperture mechanism 34 is increased to the aperture value at F/2.8 (the full aperture). Then the AE circuit 47 measures the subject light intensity again and calculates the optimum exposure time. When the calculated exposure time is less than the anti-camera shake exposure time, for instance, $1/60$ second, the capturing preparation process is completed. When the calculated exposure time is more than $1/60$ second, the ISO sensitivity is increased, by one level, to ISO 400, because the aperture value cannot be further increased.

In this state, the AE circuit 47 measures the subject light intensity again and calculates the optimum exposure time. When the calculated exposure time is $1/60$ second or less, the capturing preparation process is completed. When the exposure time is more than 1/60 second, the ISO sensitivity is further increased, by one level, to ISO 800. The ISO sensitivity is changed until the exposure time becomes 1/60 second or less. When the ISO sensitivity reaches the maximum value (ISO 1600), the capturing preparation process is completed regardless of whether or not the exposure time calculated by the AE circuit 47 becomes 1/60 second or less. After the completion of the capturing preparation process, when the shutter button 14 is fully pressed, the image capture process is executed at the exposure value, exposure time and ISO sensitivity set according to the above exposure adjustment. At this time, a shutter sound is output from the speaker 19 by the shutter sound generating circuit 48 at a pitch (frequency) according to the aperture value and ISO sensitivity. The table below shows examples of the frequencies of the shutter sound.

TABLE 1

| Aperture value | ISO sensitivity | Frequency of shutter sound |
|---|---|---|
| F/4.0 | ISO 200 | 500 Hz |
| F/2.8 | ISO 200 | 800 Hz |
| F/2.8 | ISO 400 | 1000 Hz |
| F/2.8 | ISO 800 | 1200 Hz |
| F/2.8 | ISO 1600 | 1500 Hz |

As the aperture value decreases, a focal range on which the taking lens 33 can focus also decreases. As the ISO sensitivity increases, the noise also increases and the image equality of the captured image is deteriorated. Accordingly, the user can intuitively estimate the quality of the captured image by listening to the shutter sound which corresponds to the aperture value and the ISO sensitivity.

Figure 4:
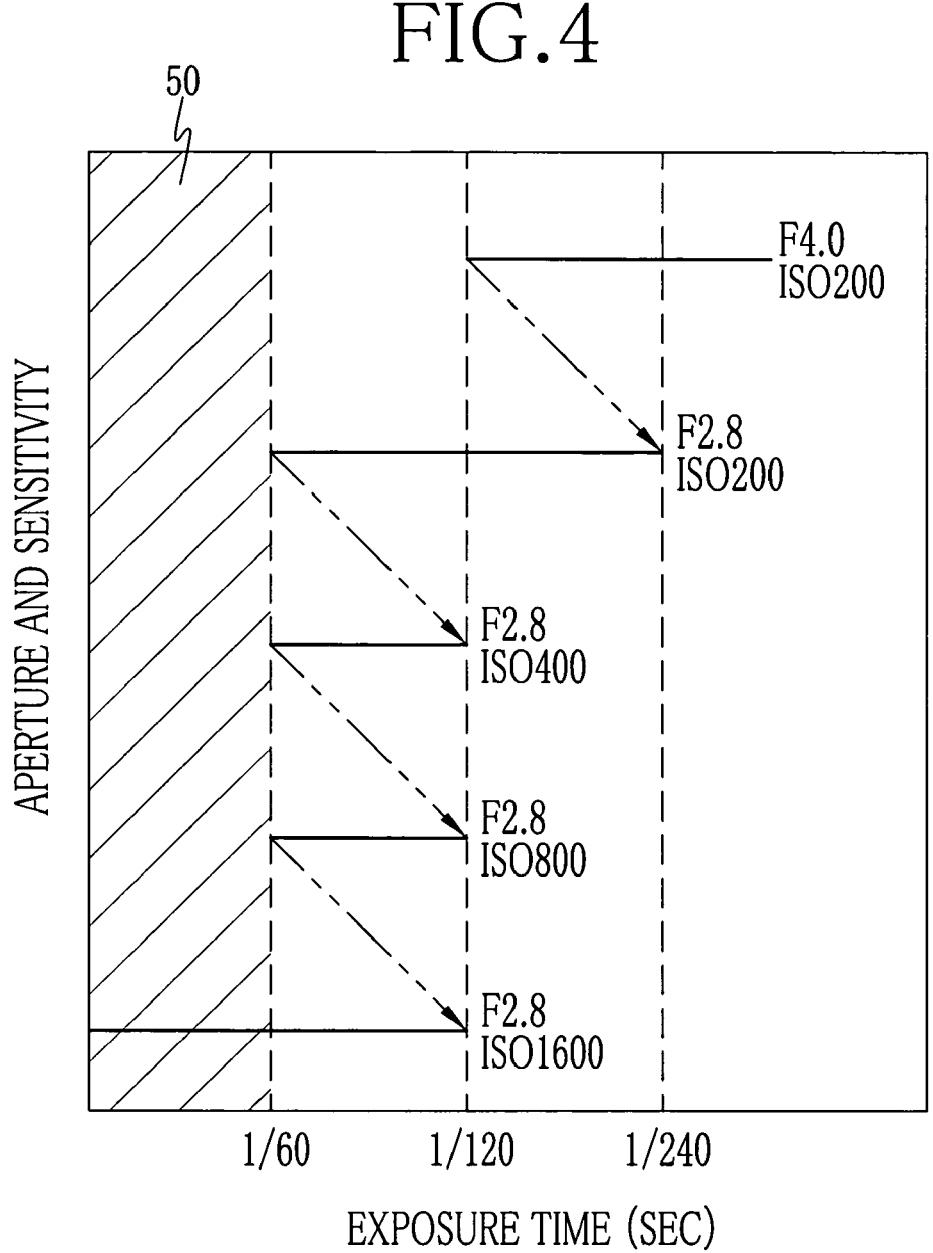
FIG. 4 is a program chart showing an example of change in aperture values, ISO sensitivities and exposure time described in the flowchart in FIG. 3.

In FIG. 4, the horizontal axis shows the exposure time and the vertical axis shows the aperture value and the ISO sensitivity together. In FIG. 4, the light amount is increased from the upper right to the lower left. In an area 50, the exposure time exceeds 1/60 second and, therefore, the image blurring is likely to occur by the camera shake (the hand shake). In the above exposure adjustment, after the aperture value is set at the maximum (F/2.8), the ISO sensitivity is increased stepwise to determine the exposure time for securing the predetermined light amount outside the area 50. However, when the ISO sensitivity reaches the maximum value (ISO 1600), the exposure time is determined regardless of the area 50.

In the above embodiment, the aperture is changed between the two values, F/4.0 and F/2.8. However, the present invention is not limited to the above values. Each of the aperture values can be determined as appropriate. Further, it is also possible that the aperture is changed between three or more values. Furthermore, a fixed aperture can be used.

In the above embodiment, the ISO sensitivity is changed by the amplifier 39 between four values, ISO 200, ISO 400, ISO 800 and ISO 1600. However, the present invention is not limited to the above values. The ISO sensitivities can be respectively determined as appropriate. That is, the ISO sensitivity can be changed between the two or more values. Further, it is also possible to continuously change the ISO sensitivity.

In the above embodiment, the anti-camera shake exposure time is set to 1/60 second to allow for margin. However, it can be set to 1/30 second which is a threshold limit of the anti-camera shake exposure time.

Further, in the above embodiment, the subject light amount is measured according to the light received by the CCD image sensor 37. However, the subject light amount can be measured by using an optical sensor provided separately from the CCD image sensor 37. In this case, an output of the optical sensor is amplified by the amplifier. The gain of the amplifier is adjusted according to the ISO sensitivity. Further, instead of the CCD image sensor 37, other types of the image sensor (the solid state imaging device), such as a CMOS (Complementary Metal Oxide Semiconductor) type and the like, can be used.

In the above embodiment, the pitch (frequency) of the shutter sound is changed according to the aperture value and the ISO sensitivity. However, the volume and the pattern of the shutter sound can be changed. Further, the shutter sound can be changed according to the ISO sensitivity only or the combination of the aperture value, the ISO sensitivity and the exposure time. The shutter sound can also be changed according to conditions other than the exposure conditions (a degree of the focus and/or a degree of the white balance). Note that it is preferable not to output the shutter sound when taking a moving image or continuous shots together with sound.

Further, the flash device can be provided to the digital camera 10. In this case, the exposure adjustment for preventing the camera shake is performed when the flash device is turned off.

Although the present invention has been described with respect to the preferred embodiment, the present invention is not to be limited to the above embodiment but, on the contrary, various modifications will be possible to those skilled in the art without departing from the scope of claims appended hereto.

What is claimed is:

1. An image capturing apparatus including an image sensor for converting an image of a subject into an electric signal and an amplifier for amplifying said electric signal according to an ISO sensitivity, said image capturing apparatus comprising:
   a measurement device for measuring light intensity of said subject;
   an exposure time calculator for calculating an exposure time of said image sensor with said ISO sensitivity according to said light intensity of said subject;
   an ISO sensitivity changing section for changing said ISO sensitivity such that said exposure time becomes shorter than a predetermined anti-camera shake exposure time; and
   a sound generator for generating a sound according to said ISO sensitivity.

2. An image capturing apparatus according to claim 1, wherein said measurement device measures said light intensity of said subject according to an output signal from said amplifier.

3. An image capturing apparatus according to claim 2, further including an aperture mechanism for changing an aperture, said aperture mechanism increasing said aperture before changing said ISO sensitivity so that said exposure time becomes shorter than said predetermined anti-camera shake exposure time.

4. An image capturing apparatus according to claim 3, wherein said ISO sensitivity is changed discretely or continuously from a predetermined default value and said exposure time is calculated according to said light intensity of said subject with a changed ISO sensitivity.

5. An image capturing apparatus according to claim 4,
   wherein said exposure time is calculated while a release button is half-pressed, and said image is captured for recording when said release button is fully pressed.

6. An image capturing apparatus according to claim 1, wherein said sound generator generates said sound when a release button is fully pressed for recording said image.

7. An image capturing method in which an image of a subject is converted into an electric signal by an image sensor, comprising the steps of:
- (A) measuring light intensity of said subject;
- (B) calculating an exposure time of said image sensor according to said light intensity of said subject;
- (C) changing a first ISO sensitivity to a second ISO sensitivity when said exposure time calculated with said first ISO sensitivity being longer than a predetermined anti-camera shake exposure time, said second ISO sensitivity being higher than said first ISO sensitivity;
- (D) repeating said steps A-C until said exposure time being shorter than said predetermined anti-camera shake exposure time; and
- (E) generating a sound according to a ISO sensitivity when a release button being fully pressed for recording said image.

8. An image capturing method according to claim 7, further comprising the steps of:
- (F) increasing an aperture when said exposure time calculated with said first ISO sensitivity being longer than said predetermined anti-camera shake exposure time;
- (G) repeating said steps A, B and F until said exposure time being shorter than said predetermined anti-camera shake exposure time; and
- (H) executing said steps C and D when said exposure time being still longer than said predetermined anti-camera shake exposure time even when said aperture becoming largest in said step G.

\* \* \* \* \*